(No Model.)

S. M. WHITE.
CHURN.

No. 425,645. Patented Apr. 15, 1890.

Witnesses,
Robert Everett
Willis Holder

Inventor:
Spencer M. White
By George N. Rea
Atty.

UNITED STATES PATENT OFFICE.

SPENCER M. WHITE, OF FISHER, ILLINOIS.

CHURN.

SPECIFICATION forming part of Letters Patent No. 425,645, dated April 15, 1890.

Application filed January 22, 1890. Serial No. 337,690. (No model.)

*To all whom it may concern:*

Be it known that I, SPENCER M. WHITE, a citizen of the United States, residing at Fisher, in the county of Champaign and State of Illinois, have invented certain new and useful Improvements in Churns; and I do hereby declare the following to be a full, clear, and exact description of the invention, such as will enable others skilled in the art to which it appertains to make and use the same.

My invention relates to churns, and more particularly to that class generally known as "reciprocating dasher;" and it has for its object to provide a churn of this character which is strong and durable, thorough and effective in operation, and economical in manufacture.

To these ends the invention consists in the novel construction and combination of parts hereinafter described and claimed.

To enable others skilled in the art to make and use my invention, I will now describe the same in detail, reference being made to the accompanying drawings, in which—

Figure 1:
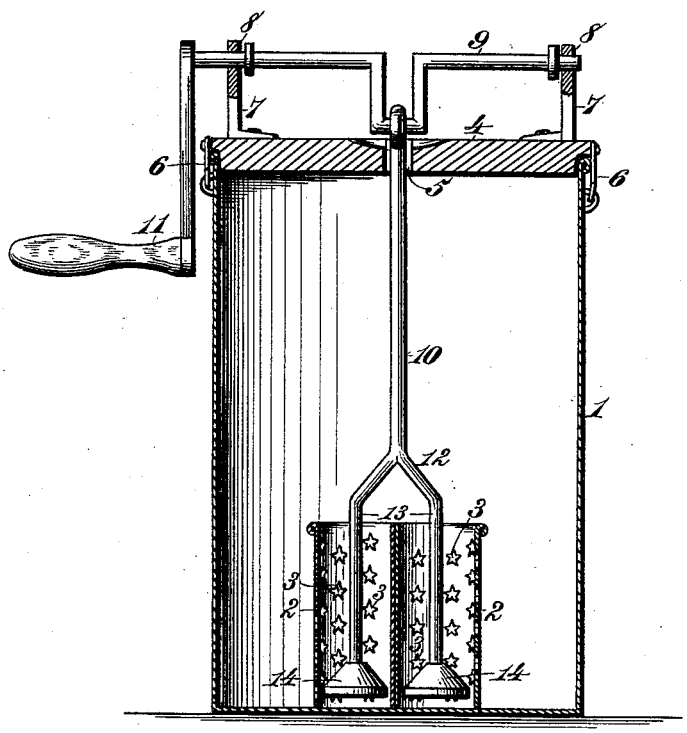
Figure 2:
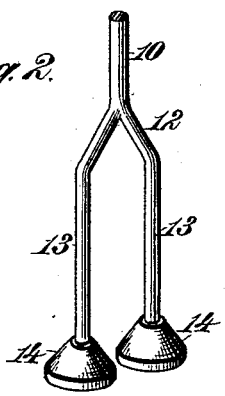

Figure 1 is a vertical central sectional view of my improved churn. Fig. 2 is a detail view of the dasher-stem and attached dashers.

In the said drawings, the reference-numeral 1 designates an outer vessel or churn-body, which is of any suitable material and shape. I prefer, however, that it be cylindrical in form. Within this outer vessel or churn-body are two small cylinders 2, which are rigidly affixed to the bottom of the outer vessel or churn-body 1, or detachably secured thereto, as may be desirable or expedient. I prefer that these cylinders 2 be placed in close relation to each other, as I have found this to be best in practice. The butter which is contained in cream and milk is inclosed within small globules, and these globules must be broken preliminary to the separation of their contents from the residue of the milk or cream. In order that this may be accomplished in a thorough and effectual manner, I puncture or perforate the smaller cylinders, as at 3. These punctures or perforations 3 are of any desired number and shape or configuration. In the drawings I have shown the perforations as of the configuration of a star, and this is preferable, in that it presents an increased number of corners, edges, and angles, against which the cream or milk is forced, thus materially aiding in the rapid breaking up of the butter-containing globules.

The numeral 4 represents the cover of the churn, which is adapted to the shape of the outer vessel or churn-body 1, and is provided with an elongated slot 5. This cover is firmly secured to the body of the churn by a suitable fastening device 6. Upon the cover are secured brackets 7, which are provided with bearings 8. Journaled in these bearings 8 is a crank-shaft 9, to the crank of which is attached the dasher-stem 10. The handle of the crank-shaft is represented by the numeral 11. The dasher-stem 10 is of any suitable material, and is forked, as at 12, and to the lower extremities of the branches 13 thereof are attached the dashers 14, which are adapted to reciprocate in the perforated cylinders 2 in unison. By thus forming the dasher-stem in one integral piece and forking the same the provision of an independent stem for each dasher is avoided, and a consequent saving of material is thereby effected; also, by this peculiar construction of dasher-stem a positive reciprocation in unison of the attached dashers is absolutely secured.

The operation of my invention is as follows: Cream or milk being introduced into the outer vessel or churn-body 1, motion is imparted to the crank-shaft 9, through the medium of the handle 11, which in turn imparts a reciprocating motion to the forked dasher-stem 10 and the attached dashers 14. By this means the milk or cream is forced into and out of the cylinders 2 through the perforations 3, striking against the edge thereof, whereby a thorough breaking up of the butter-containing globules and the separation of the oleaginous portions of the milk or cream from the residue are rapidly effected.

By my invention a thoroughly effective, strong, durable, and economical churn is provided, in the manipulation of which very little manual effort is requisite.

Having thus described my invention, what I claim as new, and desire to secure by Letters Patent, is—

1. In a churn, the combination, with the churn-body and the smaller perforated cylinders within the same, of the forked dasher-stem and the dashers attached to the branches of said stem, substantially as described.

2. In a churn, the combination, with the churn-body and the smaller perforated cylinders within the same, of the dasher-stem having forked branches formed integral therewith, and the dashers attached to the said branches, substantially as described.

In testimony whereof I have affixed my signature in presence of two witnesses.

SPENCER M. WHITE.

Witnesses:
 WILLIS HOLDER,
 GEO. W. REA.